United States Patent
Miyazaki et al.

(10) Patent No.: US 10,738,181 B2
(45) Date of Patent: Aug. 11, 2020

(54) RUBBER COMPOSITION AND PNEUMATIC TIRE

(71) Applicant: SUMITOMO RUBBER INDUSTRIES, LTD., Hyogo (JP)

(72) Inventors: Tatsuya Miyazaki, Kobe (JP); Naoya Hashimoto, Kyoto (JP); Kouji Kawaguchi, Kyoto (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 0 days.

(21) Appl. No.: 16/073,985

(22) PCT Filed: Nov. 30, 2016

(86) PCT No.: PCT/JP2016/085489
§ 371 (c)(1),
(2) Date: Jul. 30, 2018

(87) PCT Pub. No.: WO2017/145480
PCT Pub. Date: Aug. 31, 2017

(65) Prior Publication Data
US 2019/0040240 A1    Feb. 7, 2019

(30) Foreign Application Priority Data
Feb. 25, 2016 (JP) .................. 2016-034649

(51) Int. Cl.
| | | |
|---|---|---|
| *B60C 1/00* | (2006.01) | |
| *C08K 3/36* | (2006.01) | |
| *C08K 5/17* | (2006.01) | |
| *C08K 5/20* | (2006.01) | |
| *C08L 21/00* | (2006.01) | |
| *C08C 19/25* | (2006.01) | |
| *C08C 19/44* | (2006.01) | |
| *C08F 236/10* | (2006.01) | |
| *C08L 15/00* | (2006.01) | |
| *C08C 19/22* | (2006.01) | |

(52) U.S. Cl.
CPC .............. *C08L 21/00* (2013.01); *B60C 1/00* (2013.01); *B60C 1/0016* (2013.01); *C08C 19/22* (2013.01); *C08C 19/25* (2013.01); *C08C 19/44* (2013.01); *C08F 236/10* (2013.01); *C08K 3/36* (2013.01); *C08K 5/17* (2013.01); *C08K 5/20* (2013.01); *C08L 15/00* (2013.01); *B60C 1/0025* (2013.01); *B60C 1/0041* (2013.01)

(58) Field of Classification Search
CPC .... C08L 7/00; C08L 9/00; C08L 11/00; C08L 15/00; C08L 17/00; C08L 19/00; C08L 21/00; C08K 5/20; C08K 5/10; C08K 5/17; C08K 3/36; B60C 1/00; B60C 1/0016
See application file for complete search history.

(56) References Cited

U.S. PATENT DOCUMENTS

| | | | |
|---|---|---|---|
| 2,559,440 A | | 7/1951 | Wesley et al. |
| 2013/0317151 A1* | | 11/2013 | Yagi ........................ B60C 1/00 524/224 |
| 2015/0111677 A1 | | 4/2015 | Nishiyama et al. |
| 2015/0148447 A1 | | 5/2015 | Takeda |
| 2015/0376417 A1 | | 12/2015 | Dohner et al. |
| 2019/0048175 A1* | | 2/2019 | Miyazaki ................ C08K 3/36 |

FOREIGN PATENT DOCUMENTS

| | | |
|---|---|---|
| CN | 104245817 A | 12/2014 |
| CN | 104254709 A | 12/2014 |
| CN | 105264023 A | 1/2016 |
| JP | 2003-533574 A | 11/2003 |
| JP | 2009-084491 A | 4/2009 |
| JP | 2013-159653 A | 8/2013 |
| JP | 2013-242034 A | 12/2013 |
| JP | 2013-245265 A | 12/2013 |
| JP | 2014-167055 A | 9/2014 |
| JP | 2015-174992 A | 10/2015 |
| WO | 01/88027 A1 | 11/2001 |
| WO | 2013/070626 A1 | 5/2013 |
| WO | WO-2016061300 A1 * | 4/2016 |

* cited by examiner

*Primary Examiner* — Irina S Zemel
*Assistant Examiner* — Jeffrey S Lenihan
(74) *Attorney, Agent, or Firm* — Studebaker & Brackett PC

(57) ABSTRACT

The present invention provides a rubber composition which has excellent processability owing to its low rubber viscosity during kneading, despite containing a white filler, and which further has excellent fuel economy and excellent abrasion resistance. Also provided is a pneumatic tire formed from the rubber composition. The present invention relates to a rubber composition including: a rubber component, a white filler, and a compound represented by the formula (1) below, wherein X represents —CONH— or —COO—; $R^1$ represents a C7-C23 alkyl group or a C7-C23 alkenyl group; $R^2$ represents a C1-C3 alkylene group; and $R^3$ and $R^4$ each independently represent a hydrogen atom, a C1-C3 alkyl group, or a C1-C3 hydroxyalkyl group, and at least one of $R^3$ or $R^4$ is the hydroxyalkyl group.

(1)

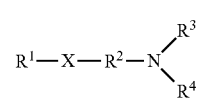

20 Claims, No Drawings

RUBBER COMPOSITION AND PNEUMATIC TIRE

TECHNICAL FIELD

The present invention relates to a rubber composition and a pneumatic tire formed from the rubber composition.

BACKGROUND ART

The recent social demand for energy saving has created a need for automobiles to have low heat build-up properties (fuel economy) and abrasion resistance. This demand has also created a need for rubber compositions for tires to have fuel economy and abrasion resistance. In this context, white fillers such as silica or aluminum hydroxide are widely used in rubber compositions for tires to improve fuel economy.

White fillers such as silica and finely divided aluminum hydroxide have problems of excessive compound viscosity, poor extrusion processability, and poor sheeting processability because these particles tend to be bound to form aggregates during kneading. Therefore, there has been a need to improve the processability of white filler-containing rubber compositions.

The prior art has reported techniques for improving the processability of rubber compositions containing white fillers such as silica. For example, Patent Literature 1 discloses an amide compound for use as a processing aid to improve dispersion of silica in rubber compositions. The amide compound has a polar end that is weakly chemically reactive with silica and a non-polar end that is weakly chemically reactive with elastic polymers. This document also describes techniques including adding the amide compound to rubber compositions containing silica. Moreover, Patent Literatures 2 to 5 disclose techniques including adding a fatty acid monoethanolamide or fatty acid diethanolamide to rubber compositions containing white fillers such as silica.

CITATION LIST

Patent Literature

Patent Literature 1: JP 2003-533574 T
Patent Literature 2: WO 2013/070626
Patent Literature 3: JP 2013-245265 A
Patent Literature 4: JP 2014-167055 A
Patent Literature 5: JP 2013-159653 A

SUMMARY OF INVENTION

Technical Problem

Although the conventional agents for improving dispersion of white fillers, i.e. fatty acid amides, fatty acid monoethanolamides, and fatty acid diethanolamides suppress aggregation of white fillers such as silica, unfortunately they have only a small effect in reducing rubber viscosity during kneading, and therefore cannot sufficiently improve dispersion of white fillers in rubber. In addition, these conventional compounds are not sufficiently effective in improving the fuel economy (tan δ), abrasion resistance, or other rubber properties of rubber compositions.

The present invention aims to solve the problem and provide a rubber composition which has excellent processability owing to its low rubber viscosity during kneading, despite containing a white filler, and which further has excellent fuel economy and excellent abrasion resistance, as well as a pneumatic tire formed from the rubber composition.

Solution to Problem

In order to obtain good dispersion of white fillers such as silica in rubber compositions, the white fillers need to be hydrophobized. In order to enhance hydrophobization of white fillers, it is necessary to make "improvement in the adsorption to white fillers" of compounds (e.g. surfactants) having both a hydrophobic group and a group adsorbing to the white fillers and also to make "improvement in the hydrophobizing ability of the adsorbing compounds themselves". From these standpoints, the present inventors studied to find novel agents for improving dispersion of white fillers. As a result, they have found that when a compound represented by the formula (1) below which is highly adsorptive to white fillers is incorporated into rubber compositions containing white fillers, the rubber viscosity during kneading is reduced to improve processability, and further the dispersibility of the white fillers is improved, thereby resulting in improved fuel economy, abrasion resistance, and wet grip performance. This finding has led to the completion of the present invention. It should be noted that wet grip performance may be improved by increasing the amount of silica while simultaneously reducing rubber viscosity during kneading and improving fuel economy.

Specifically, the present invention relates to a rubber composition, including: a rubber component, a white filler, and a compound represented by the following formula (1):

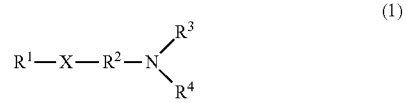

$$R^1-X-R^2-N\begin{subarray}{l}R^3\\R^4\end{subarray} \quad (1)$$

wherein X represents —CONH— or —COO—; $R^1$ represents a C7-C23 alkyl group or a C7-C23 alkenyl group; $R^2$ represents a C1-C3 alkylene group; and $R^3$ and $R^4$ each independently represent a hydrogen atom, a C1-C3 alkyl group, or a C1-C3 hydroxyalkyl group, and at least one of $R^3$ or $R^4$ represents the hydroxyalkyl group.

The compound of formula (1) is preferably a fatty acid amide ethylaminoethanol.

The white filler preferably includes silica.

The rubber composition is preferably a rubber composition for tires.

The present invention also relates to a pneumatic tire, including a tire component formed from the rubber composition.

Advantageous Effects of Invention

The present invention provides a rubber composition which has excellent processability owing to its low rubber viscosity during kneading, despite containing a white filler, and which further has excellent fuel economy and excellent abrasion resistance. Thus, the present invention provides a pneumatic tire excellent in fuel economy and abrasion resistance.

DESCRIPTION OF EMBODIMENTS

The rubber composition of the present invention includes a rubber component, a white filler, and a compound represented by the following formula (1):

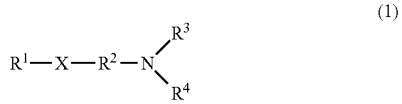
(1)

wherein X represents —CONH— or —COO—; $R^1$ represents a C7-C23 alkyl group or a C7-C23 alkenyl group; $R^2$ represents a C1-C3 alkylene group; and $R^3$ and $R^4$ each independently represent a hydrogen atom, a C1-C3 alkyl group, or a C1-C3 hydroxyalkyl group, and at least one of $R^3$ or $R^4$ represents the hydroxyalkyl group.

As mentioned earlier, when the compound of formula (1) that is highly adsorptive to white fillers is incorporated into rubber compositions containing white fillers, the rubber viscosity during kneading is reduced to improve processability, and further fuel economy and abrasion resistance are improved.

These effects may be described as follows. The compound of formula (1) has moderate polarity at two parts thereof, i.e. the hydroxy group of $R^3$ and/or $R^4$ at its molecular ends and the CONH or COO group as X around the middle of the molecule, and thus it can moderately adsorb to (interact with) the surface of white fillers (in particular, the hydroxy groups on the surface of the white fillers). For this reason, the surface of the white fillers is covered with the compound and hydrophobized by the compound, which suppresses aggregation of the white fillers and also reduces the viscosity of the compositions, thus efficiently improving dispersion of the white fillers in rubber. Consequently, the processability, wet grip performance, and further fuel economy and abrasion resistance of the rubber compositions are improved.

The group X around the middle of the molecule is —CONH— or —COO— because they increase the polarity (electron withdrawing ability) of the middle part of the molecule, and they also allow for easy production.

Moreover, the effects may also be described as follows. The compound of formula (1) is characterized by having an amino group between the —CONH— or —COO— group and an alkanol group, as compared to the conventional agents for improving dispersion of white fillers (fatty acid monoethanolamides and fatty acid diethanolamides). Due to the presence of the amino and hydroxy groups in the molecular chain, it exhibits improved adsorption properties to the surface of white fillers (in particular, the hydroxy groups on the surface of the white fillers) and thus is highly effective in reducing the viscosity of the compositions, thereby further improving dispersion of the white fillers in rubber. Furthermore, since the compound is highly adsorptive to silica due to the presence of the amino and hydroxy groups in the molecular chain, it synergistically improves the interaction of silica with silane coupling agents or the modifying groups of modified polymers and the dispersion of silica.

Non-limiting examples of the rubber component include diene rubber materials such as isoprene-based rubbers, including natural rubber (NR) and polyisoprene rubber (IR), polybutadiene rubber (BR), styrene-butadiene copolymer rubber (SBR), styrene-isoprene-butadiene copolymer rubber (SIBR), chloroprene rubber (CR), and acrylonitrile-butadiene copolymer rubber (NBR); butyl-based rubbers; ethylene-propylene-diene rubber (EPDM); and urethane rubber. These rubber materials may be used alone, or two or more of these may be used in combination. In view of fuel economy and the balance of abrasion resistance, durability, and wet grip performance, the rubber component preferably includes SBR and BR, among others.

Any styrene butadiene rubber (SBR) may be used, and examples include emulsion-polymerized SBR (E-SBR) and solution-polymerized SBR (S-SBR), which may or may not be oil extended. In particular, in view of grip performance, oil extended high molecular weight SBR is preferred. Chain end-modified or backbone-modified S-SBR which exhibits increased interaction with fillers may also be used. These types of SBR may be used alone, or two or more of these may be used in combination.

In view of grip performance, the SBR preferably has a styrene content of 16% by mass or higher, more preferably 20% by mass or higher, still more preferably 25% by mass or higher, particularly preferably 30% by mass or higher. When the styrene content is too high, styrene groups may be located adjacent to one another so that the polymer can become excessively hard, non-uniform crosslinking can easily occur, and blowing resistance during high-temperature running can be reduced. In addition, temperature dependence may increase so that greater changes in properties can be caused by temperature changes, with the result that stable grip performance during the middle and late phases of running tends not to be well achieved. Therefore, the styrene content is preferably 60% by mass or lower, more preferably 50% by mass or lower, still more preferably 45% by mass or lower.

The styrene content of the SBR as used herein is determined by 1H-NMR analysis.

In view of the Hs of the rubber composition and grip performance, the SBR preferably has a vinyl content of 10% or higher, more preferably 15% or higher. In view of grip performance, EB (durability), and abrasion resistance, the vinyl content is preferably 90% or lower, more preferably 80% or lower, still more preferably 70% or lower, particularly preferably 60% or lower.

The vinyl content (1,2-butadiene unit content) of the SBR as used herein is determined by infrared absorption spectrometry.

Moreover, the SBR preferably has a glass transition temperature (Tg) of −45° C. or higher, more preferably −40° C. or higher. The Tg is preferably 10° C. or lower, and is more preferably 5° C. or lower to prevent embrittlement cracking in winter in temperate zones.

The glass transition temperature of the SBR as used herein is determined by differential scanning calorimetry (DSC) at a rate of temperature rise of 10° C./min in accordance with JIS K 7121.

In view of fuel economy and abrasion resistance, the SBR preferably has a weight average molecular weight (Mw) of 200,000 or more, more preferably 250,000 or more, still more preferably 300,000 or more. In view of dispersion of fillers, and therefore fuel economy and abrasion resistance, the weight average molecular weight is preferably 2,000,000 or less, more preferably 1,800,000 or less.

The weight average molecular weight of the SBR as used herein may be determined by gel permeation chromatography (GPC) (GPC-8000 series, Tosoh Corporation, detector: differential refractometer, column: TSKGEL SUPERMALTPORE HZ-M, Tosoh Corporation) calibrated with polystyrene standards.

In order to obtain sufficient grip performance, the amount of the SBR, if present, based on 100% by mass of the rubber component is preferably 20% by mass or more, more preferably 30% by mass or more, still more preferably 50% by mass or more. The upper limit is not particularly critical, but is preferably 100% by mass in view of grip performance.

Any BR may be used including, for example: high cis BR such as BR1220 available from Zeon Corporation and BR130B and BR150B both available from Ube Industries, Ltd.; low-cis content modified BR such as BR1250H available from Zeon Corporation; BR containing syndiotactic polybutadiene crystals such as VCR412 and VCR617 both available from Ube Industries, Ltd.; and high cis BR synthesized using rare earth catalysts such as BUNA-CB25 available from Lanxess. These types of BR may be used alone, or two or more of these may be used in combination.

In view of durability and abrasion resistance, the BR preferably has a cis-1,4-linkage content (cis content) of 90% by mass or higher, more preferably 93% by mass or higher, still more preferably 95% by mass or higher.

In view of durability and abrasion resistance, the BR preferably has a vinyl content of 1.8% by mass or lower, more preferably 1.5% by mass or lower, still more preferably 1.0% by mass or lower, particularly preferably 0.8% by mass or lower.

The vinyl content (1,2-butadiene unit content) and cis content (cis-1,4-butadiene unit content) of the BR as used herein may be measured by infrared absorption spectrometry.

In view of abrasion resistance and fuel economy, the amount of the BR, if present, based on 100% by mass of the rubber component is preferably 10% by mass or more, more preferably 15% by mass or more, still more preferably 20% by mass or more. In view of abrasion resistance, grip performance, and fuel economy, the amount is preferably 70% by mass or less, more preferably 60% by mass or less. The amount is preferably 40% by mass or less for use in tires requiring grip performance.

In the rubber composition of the present invention, the combined amount of the SBR and the BR based on 100% by mass of the rubber component is preferably 80% by mass or more, more preferably 90% by mass or more, and may be 100% by mass. When the combined amount is less than 80% by mass, the effects of the present invention may not be sufficiently achieved.

Examples of the white filler include silica, aluminum hydroxide, alumina (aluminum oxide), calcium carbonate, and talc. These white fillers may be used alone, or two or more of these may be used in combination. In particular, white fillers having a COO group are preferred in order to more suitably achieve the effects of the present invention. Among these fillers, silica and/or aluminum hydroxide are/is preferably used because they provide excellent abrasion resistance, durability, wet grip performance, and fuel economy.

Non-limiting examples of the silica include dry silica (silicic anhydride) and wet silica (hydrated silicic acid). These types of silica may be used alone, or two or more of these may be used in combination. Among these, wet silica is preferred because it has a large number of silanol groups.

In view of dispersibility, abrasion resistance, wet grip performance, and processability, the silica preferably has a BET specific surface area (nitrogen adsorption specific surface area, $N_2SA$) of 70 to 300 $m^2/g$, more preferably 80 to 280 $m^2/g$, still more preferably 90 to 250 $m^2/g$.

The $N_2SA$ of the silica as used herein is measured by the BET method in accordance with ASTM D3037-81.

In view of wet grip performance, the amount of the silica, if present, per 100 parts by mass of the rubber component is preferably 20 parts by mass or more, more preferably 30 parts by mass or more, still more preferably 40 parts by mass or more. In order to obtain processability, suppress shrinkage associated with cooling after vulcanization, and ensure fracture resistance (TB), the amount of the silica is also preferably 150 parts by mass or less, more preferably 140 parts by mass or less.

In view of wet grip performance, the aluminum hydroxide preferably has a BET specific surface area (nitrogen adsorption specific surface area, $N_2SA$) of 5 $m^2/g$ or more, more preferably 10 $m^2/g$ or more, still more preferably 12 $m^2/g$ or more. In view of dispersibility of the aluminum hydroxide, prevention of reaggregation, and abrasion resistance, the BET specific surface area of the aluminum hydroxide is also preferably 60 $m^2/g$ or less, more preferably 50 $m^2/g$ or less, still more preferably 40 $m^2/g$ or less.

The BET specific surface area of the aluminum hydroxide as used herein is measured by the BET method in accordance with ASTM D3037-81.

In view of dispersibility of the aluminum hydroxide, prevention of reaggregation, and abrasion resistance, the aluminum hydroxide preferably has an average particle size (D50) of 0.1 μm or more, more preferably 0.2 μm or more, still more preferably 0.3 μm or more. In view of abrasion resistance, the average particle size (D50) of the aluminum hydroxide is preferably 3.0 μm or less, more preferably 2.0 μm or less.

The average particle size (D50) as used herein refers to the particle size at a cumulative mass of 50% on a particle size distribution curve obtained using a particle size distribution analyzer.

In view of grip performance, the amount of the aluminum hydroxide, if present, per 100 parts by mass of the rubber component is preferably 1 part by mass or more, more preferably 2 parts by mass or more, still more preferably 3 parts by mass or more. In view of abrasion resistance, the amount of the aluminum hydroxide is also preferably 60 parts by mass or less, more preferably 55 parts by mass or less, still more preferably 50 parts by mass or less.

In view of wet grip performance, the amount of the white filler per 100 parts by mass of the rubber component is preferably 20 parts by mass or more, more preferably 30 parts by mass or more, still more preferably 40 parts by mass or more. In order to obtain processability, suppress shrinkage associated with cooling after vulcanization, and ensure fracture resistance (TB), the amount of the white filler is also preferably 150 parts by mass or less, more preferably 140 parts by mass or less.

In the present invention, since the compound of formula (1) is incorporated, the white filler suitably disperses in the rubber composition even when the amount of the white filler is increased (to 80 parts by mass or more). Consequently, better processability, fuel economy, and abrasion resistance are obtained.

The silica is preferably used together with a silane coupling agent. Any silane coupling agent conventionally used with silica in the rubber industry may be used. Examples of the silane coupling agent include: sulfide silane coupling agents such as bis(3-triethoxysilylpropyl)disulfide and bis(3-triethoxysilylpropyl)tetrasulfide; mercapto silane coupling agents (mercapto group-containing silane coupling agents) such as 3-mercaptopropyltrimethoxysilane, and NXT-Z100, NXT-Z45, and NXT (all available from Momentive Performance Materials); vinyl silane coupling agents such as vinyltriethoxysilane; amino silane coupling agents such as 3-aminopropyltriethoxysilane; glycidoxy silane coupling agents such as γ-glycidoxypropyltriethoxysilane; nitro silane coupling agents such as 3-nitropropyltrimethoxysilane; and chloro silane coupling agents such as 3-chloropropyltrimethoxysilane. These silane coupling agents may be used alone, or two or more of these may be used in combination. Among these, sulfide silane coupling agents or mercapto silane coupling agents are preferred because they strongly bind to silica and thus provide excellent fuel economy. Moreover, it is also preferred to use mercapto silane coupling agents in order to suitably improve fuel economy and abrasion resistance.

In order to obtain a sufficient effect in improving filler dispersion and other effects such as reduction in viscosity, the amount of the silane coupling agent, if present, per 100 parts by mass of the silica is preferably 4.0 parts by mass or more, more preferably 6.0 parts by mass or more. The amount of the silane coupling agents is preferably 12 parts by mass or less, more preferably 10 parts by mass or less, because otherwise the coupling effect and the silica-dispersing effect may be insufficient, thereby resulting in a decrease in reinforcing properties.

The rubber composition of the present invention includes a compound represented by the following formula (1):

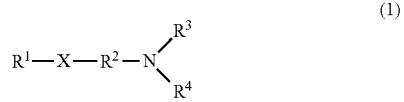

(1)

wherein X represents —CONH— or —COO—; $R^1$ represents a C7-C23 alkyl group or a C7-C23 alkenyl group; $R^2$ represents a C1-C3 alkylene group; and $R^3$ and $R^4$ each independently represent a hydrogen atom, a C1-C3 alkyl group, or a C1-C3 hydroxyalkyl group, and at least one of $R^3$ or $R^4$ is the hydroxyalkyl group.

The group X in formula (1) is —CONH— or —COO— because they increase the polarity (electron withdrawing ability) of the middle part of the molecule, and they also allow for easy production. In order to more suitably achieve the effects of the present invention, X is preferably —CONH—.

In view of adsorption to the white filler and the hydrophobizing ability of the compound of formula (1) itself, $R^1$ in formula (1) is a C7-C23 alkyl group or a C7-C23 alkenyl group. The alkyl or alkenyl group may be linear, branched, or cyclic, preferably linear. Examples include alkyl groups such as octyl, nonyl, isononyl, decyl, undecyl, dodecyl, tridecyl, isotridecyl, tetradecyl, hexadecyl, heptadecyl, octadecyl, nonadecyl, heneicosyl, and tricosyl groups; and alkenyl groups such as octenyl, nonenyl, decenyl, and heptadecenyl groups. Examples of preferred raw materials of the compound include fatty acids such as lauric acid, tridecylic acid, myristic acid, palmitic acid, stearic acid, behenic acid, oleic acid, coconut oil fatty acids, palm kernel oil fatty acids, palm oil fatty acids, hydrogenated palm oil fatty acids, beef tallow fatty acids, and hydrogenated beef tallow fatty acids; methyl esters of the foregoing fatty acids; and fats and oils such as coconut oil, palm kernel oil, palm oil, hydrogenated palm oil, beef tallow, and hydrogenated beef tallow.

If the carbon number of $R^1$ in formula (1) is more than 23, the density of the polar groups such as amino and COO groups decreases so that the polarity is reduced, and therefore the adsorbability to the white filler surface tends to be reduced. Conversely, if the carbon number of $R^1$ is 6 or less, the adsorbability tends to be too high, thereby inhibiting bonding between the silane coupling agent and the white filler (in particular, silica).

In order to more suitably achieve the effects of the present invention, $R^1$ is preferably a C9-C21, more preferably C11-C19, still more preferably C15-C19 alkyl or alkenyl group.

In order to more suitably achieve the effects of the present invention, $R^1$ is preferably an alkyl group.

$R^2$ in formula (1) is a C1-C3 alkylene group in order to provide moderate hydrophobic/hydrophilic amphoteric surfactant properties to the compound of formula (1). The alkylene group may be linear or branched, preferably linear.

Examples of the C1-C3 alkylene group include methylene, ethylene, and propylene groups.

If the carbon number of $R^2$ in formula (1) is more than 3, moderate hydrophobic/hydrophilic amphoteric surfactant properties tend not to be provided to the compound of formula (1), and thus the adsorbability to the white filler surface tends to be reduced.

In view of the adsorbability to the white filler of the end portion of the compound of formula (1), $R^3$ and $R^4$ in formula (1) each independently represent a hydrogen atom, a C1-C3 alkyl group, or a C1-C3 hydroxyalkyl group, and at least one of $R^3$ or $R^4$ is the hydroxyalkyl group.

The C1-C3 alkyl group may be linear, branched, or cyclic, preferably linear. Examples of the C1-C3 alkyl group include methyl, ethyl, and propyl groups.

If the carbon number of the alkyl group is more than 3, the density of the polar groups such as amino and hydroxy groups decreases so that the polarity is reduced, and therefore the adsorbability to the white filler surface tends to be reduced.

The C1-C3 hydroxyalkyl group may be linear, branched, or cyclic, preferably linear. Examples of the alkyl group (i.e. C1-C3 alkyl group) of the C1-C3 hydroxyalkyl group include methyl, ethyl, and propyl groups.

If the carbon number of the hydroxyalkyl group is more than 3, the density of the polar groups such as amino and hydroxy groups decreases so that the polarity is reduced, and therefore the adsorbability to the white filler surface tends to be reduced.

In order to more suitably achieve the effects of the present invention, preferably one of $R^3$ or $R^4$ is a hydrogen atom and the other is a hydroxyalkyl group. This is probably because then, like the terminal hydroxyl group, the amino group in the molecular chain may readily adsorb to the surface of the white filler (in particular, the hydroxy groups on the surface of the white filler), thereby facilitating neutralization of the acidity formed on the surface of the white filler.

Specific examples of the compound of formula (1) include fatty acid amide ethylaminoethanols such as lauric acid amide ethylaminoethanol and stearic acid amide ethylaminoethanol; fatty acid ester ethylaminoethanols such as lauric acid ester ethylaminoethanol and stearic acid ester ethylaminoethanol; stearic acid amide (N-methyl)ethylaminoethanol, stearic acid amide (N-ethanol)ethylaminoethanol, lauric acid amide methylaminoethanol, stearic acid amide methylaminoethanol, lauric acid amide propylaminoethanol, stearic acid amide propylaminoethanol, lauric acid amide ethylaminomethanol, stearic acid amide ethylaminomethanol, lauric acid amide ethylaminopropanol, stearic acid amide ethylaminopropanol, stearic acid ester (N-methyl) ethylaminoethanol, stearic acid ester (N-ethanol)ethylaminoethanol, lauric acid ester methylaminoethanol, stearic acid ester methylaminoethanol, lauric acid ester propylaminoethanol, stearic acid ester propylaminoethanol, lauric acid ester ethylaminomethanol, stearic acid ester ethylaminomethanol, lauric acid ester ethylaminopropanol, and stearic acid ester ethylaminopropanol. These compounds may be used alone, or two or more of these may be used in combination. In order to more suitably achieve the effects of the present invention, fatty acid amide ethylaminoethanols are preferred among these, with lauric acid amide ethylaminoethanol or stearic acid amide ethylaminoethanol being more preferred, with stearic acid amide ethylaminoethanol being still more preferred. This is probably because, like the terminal hydroxy group, the amino group in the molecular chain of these compounds may readily adsorb to the surface of the white filler (in particular, the hydroxy groups on the surface of the white filler), thereby facilitating neutralization of the acidity formed on the surface of the white filler.

The compound of formula (1) may be synthesized by known methods. For example, fatty acid amide ethylaminoethanols may be prepared by mixing a fatty acid or fatty acid methyl ester with 2-(2-aminoethylamino)ethanol, heating the mixture at 120° C. to 180° C., and evaporating the generated water or methanol.

The amount of the compound of formula (1) per 100 parts by mass of the rubber component is preferably 0.5 parts by mass or more, more preferably 1 part by mass or more, still more preferably 2 parts by mass or more, because in this case, the compound moderately interacts with the white filler without inhibiting the reaction of the silane coupling agent, if present, with the white filler (particularly silica), i.e. without excessively lubricating the surface of the white filler, and thus produces the effects of reducing viscosity and improving dispersion of the white filler. The amount of the compound is also preferably 10 parts by mass or less, more preferably 8 parts by mass or less, still more preferably 6 parts by mass or less, in order to improve fuel economy, wet grip performance, and abrasion resistance without excessively lubricating the surface of the white filler.

The rubber composition of the present invention may appropriately contain other compounding agents usually used to produce rubber compositions, such as carbon black, resin materials, oils, zinc oxide, stearic acid, antioxidants, waxes, vulcanizing agents, and vulcanization accelerators, in addition to the aforementioned components.

In view of grip performance and abrasion resistance, the carbon black preferably has a nitrogen adsorption specific surface area ($N_2SA$) of 80 $m^2/g$ or more, more preferably 100 $m^2/g$ or more, still more preferably 120 $m^2/g$ or more. In order to ensure good filler dispersion, the $N_2SA$ is also preferably 600 $m^2/g$ or less, more preferably 450 $m^2/g$ or less, still more preferably 200 $m^2/g$ or less.

The $N_2SA$ of the carbon black is determined by the BET method in accordance with JIS K 6217-2:2001.

The amount of the carbon black, if present, per 100 parts by mass of the rubber component is 3 parts by mass or more in order to ensure abrasion resistance and prevention of UV-induced cracking. The preferred amount of the carbon black depends on the intended tire component, or the grip performance, abrasion resistance, or fuel economy expected of the tire. For use in tires in which wet grip performance is ensured by using silica, such as tread portions of general-purpose tires, the amount of the carbon black per 100 parts by mass of the rubber component is preferably 5 to 30 parts by mass. For use in tire's in which dry grip performance and abrasion resistance are ensured by using carbon black, such as tread portions of racing tires, the amount of the carbon black per 100 parts by mass of the rubber component is preferably 40 to 140 parts by mass.

The rubber composition of the present invention preferably contains a vulcanization accelerator. Any type of vulcanization accelerator may be used, including generally used ones. Examples of the vulcanization accelerator include thiazole, thiuram, thiourea, guanidine, dithiocarbamate, aldehyde-amine or aldehyde-ammonia, imidazoline, and xanthate vulcanization accelerators. These vulcanization accelerators may be used alone, or two or more of these may be used in combination. Thiazole vulcanization accelerators are preferred among these, and combinations of thiazole vulcanization accelerators and guanidine vulcanization accelerators are more preferred.

Examples of thiazole vulcanization accelerators include sulfenamide vulcanization accelerators such as N-tert-butyl-2-benzothiazolylsulfenamide (TBBS), N-cyclohexyl-2-benzothiazolylsulfenamide (CBS), and N,N-dicyclohexyl-2-benzothiazolylsulfenamide (DCBS); N-tert-butyl-2-benzothiazolylsulfenimide (TBSI); di-2-benzothiazolyl disulfide (DM); and 2-mercaptobenzothiazole (M). Among these, sulfenamide vulcanization accelerators are preferred. Examples of guanidine vulcanization accelerators include diphenylguanidine, diorthotolyguanidine, and triphenylguanidine. These vulcanization accelerators may be used alone, or two or more of these may be used in combination.

In the case where the rubber composition contains a vulcanization accelerator, the amount of the vulcanization accelerator is not particularly limited and may be freely chosen depending on the desired cure rate or crosslink density. The amount of the vulcanization accelerator, if present, per 100 parts by mass of the rubber component is preferably 0.5 to 10 parts by mass.

In the present invention, the acidity of the rubber composition is shifted to the alkaline side by the incorporation of the compound of formula (1). This allows for reduction in the amount of guanidine vulcanization accelerators. Guanidine vulcanization accelerators cause an alkaline shift of the rubber composition and promote the reaction between sulfenamide vulcanization accelerators and sulfur; however, they may cut the bonds between silica and silane coupling agents formed by kneading. Moreover, an excess amount of guanidine vulcanization accelerators may bloom as white insolubles either by themselves or by binding to sulfenamide vulcanization accelerators, thereby possibly spoiling the appearance of the tires. In contrast, the claimed invention allows for reduction in the amount of guanidine vulcanization accelerators, thereby providing better tire properties (e.g. fuel economy and abrasion resistance) and improved tire appearance.

When the rubber composition contains a guanidine vulcanization accelerator, the amount of the guanidine vulcanization accelerator per 100 parts by mass of the rubber component is preferably 0 to 3 parts by mass, more preferably 0.1 to 1.5 parts by mass. In such cases, better tire properties (e.g. fuel economy and abrasion resistance) and improved tire appearance are obtained.

The rubber composition of the present invention preferably contains a resin material (resin) to more suitably achieve the effects of the present invention.

Any resin usually used in the tire industry may be used. Examples of the resin include coumarone-indene resins, α-methylstyrene-based resins, terpene-based resins, p-t-butylphenol acetylene resins, and acrylic resins. These resins may be used alone, or two or more of these may be used in combination. In order to more suitably achieve the effects of the present invention, terpene-based resins are preferred among these.

Any terpene-based resin having a unit derived from a terpene compound may be used. Examples include polyterpenes (resins produced by polymerizing terpene compounds), terpene aromatic resins (resins produced by copolymerizing terpene compounds with aromatic compounds), and aromatic-modified terpene resins (resins obtained by modifying terpene resins with aromatic compounds). Among these, terpene aromatic resins are preferred.

The term "terpene compound" refers to a hydrocarbon represented by the compositional formula $(C_5H_8)_n$ or an oxygen-containing derivative thereof, each of which has a terpene basic skeleton and is classified as a monoterpene $(C_{10}H_{16})$, sesquiterpene $(C_{15}H_{24})$, diterpene $(C_{20}H_{32})$, or other terpenes. Examples of the terpene compounds include α-pinene, β-pinene, dipentene, limonene, myrcene, alloocimene, ocimene, α-phellandrene, α-terpinene, γ-terpinene, terpinolene, 1,8-cineole, 1,4-cineole, α-terpineol, β-terpineol, and γ-terpineol. Other examples of the terpene compound include resin acids (rosin acids) such as abietic acid, neoabietic acid, palustric acid, levopimaric acid, pimaric acid, and isopimaric acid. In other words, the terpene-based resins include rosin-based resins containing, as principal components, rosin acids obtained by processing rosin. Examples of the rosin-based resins include natural rosin resins (polymerized rosins) such as gum rosins, wood rosins, and tall oil rosins; modified rosin resins such as maleic acid-modified rosin resins and rosin-modified phenol resins; rosin esters such as rosin glycerol esters; and disproportionated rosin resins obtained by disproportionating rosin resins.

The aromatic compounds may be any compound having an aromatic ring. Examples include phenol compounds such as phenol, alkylphenols, alkoxyphenols, and unsaturated hydrocarbon group-containing phenols; naphthol compounds such as naphthol, alkylnaphthols, alkoxynaphthols, and unsaturated hydrocarbon group-containing naphthols; and styrene and styrene derivatives such as alkylstyrenes, alkoxystyrenes, and unsaturated hydrocarbon group-containing styrenes. Styrene is preferred among these.

The resin preferably has a softening point of 30° C. or higher, more preferably 60° C. or higher, still more preferably 80° C. or higher, particularly preferably 100° C. or higher. The softening point is also preferably 160° C. or lower, more preferably 140° C. or lower. When the softening point falls within the range indicated above, the effects of the present invention may be more suitably achieved.

In the present invention, the softening point of the resin is determined in accordance with JIS K 6220-1:2001 using a ring and ball softening point measuring apparatus and defined as the temperature at which the ball drops down.

The resin may be a hydrogenated one. In order to more suitably achieve the effects of the present invention, the resin is preferably a hydrogenated resin. The hydrogenation may be carried out by known methods. Suitable examples of such methods include metal-catalyzed catalytic hydrogenation, and hydrazine-based methods (see, for example, JP S59-161415 A). The metal-catalyzed catalytic hydrogenation may be carried out, for example, by adding hydrogen under pressure in an organic solvent in the presence of a metal catalyst. Suitable examples of the organic solvent include tetrahydrofuran, methanol, and ethanol. These organic solvents may be used alone, or two or more of these may be used in admixture. Suitable examples of the metal catalyst include palladium, platinum, rhodium, ruthenium, and nickel. These metal catalysts may be used alone, or two or more of these may be used in admixture. The pressure to be applied is preferably, for example, 1 to 300 kgf/cm².

The resin may have a degree of hydrogenation of double bonds of 1 to 100%. In particular, the degree of hydrogenation of double bonds is preferably 2% or higher, more preferably 5% or higher, still more preferably 8% or higher. The upper limit of the degree of hydrogenation of double bonds is not precisely defined at present because its preferred range may change due to factors related to hydrogenation reactions, such as advances in production technology (e.g. heating and pressurizing conditions, catalysts), or improvements in productivity. Under the current circumstances, the upper limit is preferably, for example, 80% or lower, more preferably 60% or lower, still more preferably 40% or lower, further preferably 30% or lower, particularly preferably 25% or lower.

The degree of hydrogenation (hydrogenation ratio) is calculated from the integrals of the double bond peaks determined by $^1$H-NMR (proton NMR) according to the equation below. The degree of hydrogenation (hydrogenation ratio) herein refers to the percentage of hydrogenated double bonds.

Hydrogenation ratio (%)=$((A-B)/A)\times100$ where A: the integral of the double bond peaks before hydrogenation; and
B: the integral of the double bond peaks after hydrogenation.

The amount of the resin, if present, per 100 parts by mass of the rubber component is preferably 1 part by mass or more, more preferably 3 parts by mass or more. The amount is also preferably 50 parts by mass or less, more preferably 30 parts by mass or less, still more preferably 15 parts by mass or less. When the amount falls within the range indicated above, the effects of the present invention may be more suitably achieved.

The rubber composition of the present invention may be prepared by usual methods. For example, the rubber composition may be prepared by kneading the aforementioned components other than crosslinking agents and vulcanization accelerators in a known kneading device usually used in the rubber industry, such as a Banbury mixer, a kneader, or an open roll mill, adding the crosslinking agents and vulcanization accelerators to the kneaded mixture and further kneading them, followed by vulcanization.

The rubber composition of the present invention may be used in tire components such as treads, undertreads, carcasses, sidewalls, and beads of tires, and other industrial rubber products such as rubber footwear soles, vibration-proof rubbers, belts, and hoses. Particularly in view of the ability to improve wet grip performance and abrasion resistance, it is preferably used as a rubber composition for tires or a rubber composition for rubber footwear soles, and more preferably for the manufacture of tires including treads formed of the inventive rubber composition or footwear (sports shoes) including rubber footwear soles formed of the inventive rubber composition.

The pneumatic tire according to the present invention may be manufactured using the rubber composition by usual methods. Specifically, the rubber composition containing the aforementioned components, before vulcanization, may be extruded into the shape of, for example, a tread and then assembled with other tire components on a tire building machine in a usual manner to build an unvulcanized tire, which may then be heated and pressurized in a vulcanizer to produce a tire.

The pneumatic tire of the present invention may be used as a tire for passenger vehicles, trucks and buses, two-wheel vehicles, or other vehicles, or as a high performance tire, for example. The term "high performance tire" as used herein refers to a tire with particularly excellent grip performance, conceptually including racing tires for racing vehicles.

EXAMPLES

The present invention will be specifically described with reference to, but not limited to, examples.

The chemicals used in the examples and comparative examples are as follows.

<SBR 1>: an SBR prepared by the production method described later (S-SBR, extender oil: 37.5 parts, styrene content: 41% by mass, vinyl content: 40%, Tg: −29° C., weight average molecular weight: 1,190,000)

<SBR 2>: N9548 available from Zeon Corporation (E-SBR, extender oil: 37.5 parts, styrene content: 35% by mass, vinyl content: 18%, Tg: —40° C., weight average molecular weight: 1,090,000)

<BR>: CB24 available from LANXESS (a high-cis BR synthesized using a Nd catalyst, Tg: −110° C., cis content: 96% by mass, vinyl content: 0.7% by mass)

<Carbon black>: SHOBLACK N110 ($N_2SA$: 142 $m^2/g$) available from Cabot Japan K. K.

<Silica 1>: ULTRASIL VN3 ($N_2SA$: 175 $m^2/g$) available from Evonik Degussa

<Silica 2>: ULTRASIL U9000Gr ($N_2SA$: 235 $m^2/g$) available from Evonik Degussa <Silane coupling agent 1>: Si75 (bis(3-triethoxysilyl-propyl)disulfide) available from Evonik Degussa <Silane coupling agent 2>: NXT (8-mercaptooctanoyl-triethoxysilane) available from Momentive Performance Materials <Silane coupling agent 3>: NXT-Z45 (mercapto silane coupling agent) available from Momentive Performance Materials <Aluminum hydroxide>: Ath#B (average particle size: 0.6 μm, $N_2SA$: 15 $m^2/g$) available from Sumitomo Chemical Co., Ltd.

<Wax>: Ozoace 0355 available from Nippon Seiro Co., Ltd.

<Antioxidant 1>: Antigene 6C (6PPD, N-(1,3-dimethylbutyl)-N'-phenyl-p-phenylenediamine) available from Sumitomo Chemical Co., Ltd.

<Antioxidant 2>: Nocrac 224 (TMQ, 2,2,4-trimethyl-1,2-dihydroquinoline polymer) available from Ouchi Shinko Chemical Industrial Co., Ltd.

<Compound 1>: Trial product 1 available from Sanyo Chemical Industries, Ltd. (lauric acid amide ethylaminoethanol, the compound represented by the following formula (a compound of formula (1))

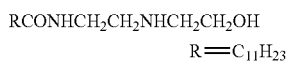

<Compound 2>: Trial product 2 available from Sanyo Chemical Industries, Ltd. (stearic acid amide ethylaminoethanol, the compound represented by the following formula (a compound of formula (1))

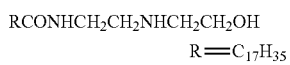

<Compound 3>: Trial product 3 available from Sanyo Chemical Industries, Ltd. (stearic acid amide (N-methyl) ethylaminoethanol, the compound represented by the following formula (a compound of formula (1))

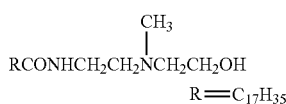

<Compound 4>: Trial product 4 available from Sanyo Chemical Industries, Ltd. (stearic acid amide (N-ethanol) ethylaminoethanol, the compound represented by the following formula (a compound of formula (1))

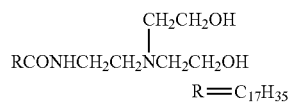

<Compound 5>: Trial product 5 available from Sanyo Chemical Industries, Ltd. (stearic acid ester ethylaminoethanol, the compound represented by the following formula)

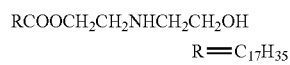

<Compound 6>: PROFAN SME available from Sanyo Chemical Industries, Ltd. (stearic acid monoethanolamide, the compound represented by the following formula)

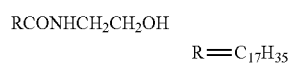

<Compound 7>: PROFAN AB-20 available from Sanyo Chemical Industries, Ltd. (coconut fatty acid monoethanolamide, the compound represented by the following formula)

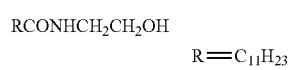

<Compound 8>: EF 44 (fatty acid zinc salt) available from STRUKTOL

<Process oil>: Vivatec 500 (TDAE oil, Tg: −58° C.) available from H& R

<Resin>: M125 available from Yasuhara Chemical Co., Ltd. (hydrogenated terpene-styrene resin, degree of hydrogenation: 11%, softening point: 123° C., Tg: 69° C., hydroxyl value: 0 mg KOH/g, SP value: 8.52)

<Zinc oxide>: zinc oxide #2 available from Mitsui Mining & Smelting Co., Ltd.

<Stearic acid>: stearic acid "TSUBAKI" available from NOF Corporation

<Sulfur>: HK-200-5 (oil content: 5% by mass) available from Hosoi Chemical Industry Co., Ltd.

<Vulcanization accelerator 1>: Nocceler NS-G (TBBS, N-tert-butyl-2-benzothiazolylsulfenamide) available from Ouchi Shinko Chemical Industrial Co., Ltd.

<Vulcanization accelerator 2>: NOCCELER D (DPG, 1,3-diphenylguanidine) available from Ouchi Shinko Chemical Industrial Co., Ltd.

Method for Producing SBR 1

(1) Preparation of Chain End Modifier

To a 250 mL measuring flask in a nitrogen atmosphere were added 20.8 g of 3-(N,N-dimethylamino)propyltrimethoxysilane (available from AZmax. Co.) and then anhydrous hexane (available from Kanto Chemical Co., Inc.) to give a total volume of 250 mL, whereby a chain end modifier was prepared.

(2) Preparation of SBR 1

A sufficiently nitrogen-purged 30 L pressure-resistant vessel was charged with 18 L of n-hexane, 800 g of styrene (available from Kanto Chemical Co., Inc.), 1,200 g of butadiene, and 1.1 mmol of tetramethylethylenediamine, and the temperature was raised to 40° C. Next, after 1.8 mL of 1.6 M butyllithium (available from Kanto Chemical Co., Inc.) was added to the mixture, the temperature was raised to 50° C., followed by stirring for three hours. Subsequently, 4.1 mL of the chain end modifier was added to the resulting mixture, followed by stirring for 30 minutes. After 15 mL of methanol and 0.1 g of 2,6-tert-butyl-p-cresol (available from Ouchi Shinko Chemical Industrial Co., Ltd.) were added to the reaction solution, 1,200 g of TDAE was added and stirred for 10 minutes. Thereafter, aggregates were recovered from the polymer solution by steam stripping. The aggregates were dried under reduced pressure for 24 hours to obtain SBR 1. The SBR 1 had a bound styrene content of 41% by mass, a vinyl content of 40%, a Tg of −29° C., and a Mw of 1,190,000.

Examples and Comparative Examples

The chemicals other than the sulfur and vulcanization accelerators used in each of the formulations shown in Table 1 or Table 2 were kneaded in a 1.7 L internal Banbury mixer at a discharge temperature of 170° C. for five minutes to give a kneaded mixture. The kneaded mixture was further kneaded (re-milled) in the Banbury mixer at a discharge temperature of 150° C. for four minutes. Thereafter, the sulfur and vulcanization accelerators were added to the kneaded mixture, and they were kneaded using an open two-roll mill for four minutes to reach 105° C., thereby giving an unvulcanized rubber composition. The unvulcanized rubber composition was molded and vulcanized at 170° C. under a pressure of 25 kgf/cm$^2$ for 12 minutes to prepare a test rubber composition.

Separately, the unvulcanized rubber composition was extrusion-molded using an extruder equipped with a die having a predetermined shape and then assembled with other tire components to build an unvulcanized tire. The unvulcanized tire was press-vulcanized at 170° C. for 12 minutes to prepare a test tire. The test rubber compositions and test tires prepared as above were evaluated as described below. Tables 1 and 2 show the results.

<Viscosity Index>

The Mooney viscosity (ML1+4) of each unvulcanized rubber composition was measured at a temperature of 130° C. in accordance with JIS K 6300-1 "Rubber, unvulcanized—Physical property—Part 1: Determination of Mooney viscosity and pre-vulcanization characteristics with Mooney viscometer". The reciprocals of the measured Mooney viscosities are expressed as an index, with Comparative Example 1 set equal to 100. A higher viscosity index indicates a lower Mooney viscosity and better processability. The target property value is 108 or higher.

<Fuel Economy Index>

The loss tangent, tan δ, of each test rubber composition was measured using a viscoelastic spectrometer VES (available from Iwamoto Seisakusho Co., Ltd.) at a temperature of 50° C., a frequency of 10 Hz, an initial strain of 10%, and a dynamic strain of 2%. A lower tan δ value indicates less heat build-up and better fuel economy. The reciprocals of the tan δ values are expressed as an index, with Comparative Example 1 set equal to 100. A higher index indicates better fuel economy. The target fuel economy index value is 100 or higher.

<Abrasion Resistance Index>

A set of test tires was mounted on a front-engine, rear-wheel-drive car of 2,000 cc displacement made in Japan. The car was subjected to a 500 km long run at the Okayama International Circuit in Japan.

Running mode: Severe handling including tight figure-eight turns which could reduce the depth of the main tread grooves by about 1 mm per 20 km of running.

After the run, the remaining groove depth in the tire tread rubber (initial depth: 8.0 mm) was measured to evaluate abrasion resistance. A larger average remaining depth of the main grooves indicates better abrasion resistance. The remaining groove depths are expressed as an index, with Comparative Example 1 set equal to 100. A higher index indicates better abrasion resistance. The target abrasion resistance index value is 100 or higher.

TABLE 1

| | | Example | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Formulation (parts by mass) | SBR 1 | 96.3 | 96.3 | 96.3 | 96.3 | 96.3 | 96.3 | 96.3 | 96.3 | 96.3 | 96.3 | — | 96.3 |
| | SBR 2 | — | — | — | — | — | — | — | — | — | — | 96.3 | — |
| | BR | 30 | 30 | 30 | 30 | 30 | 30 | 30 | 30 | 30 | 30 | 30 | 30 |
| | Carbon black | 5 | 5 | 5 | 5 | 5 | 5 | 5 | 5 | 5 | 5 | 5 | 5 |
| | Silica 1 | 100 | 100 | 100 | 100 | 100 | 100 | 80 | 95 | 80 | 80 | 100 | 100 |
| | Silica 2 | — | — | — | — | — | — | 20 | — | 20 | 20 | — | — |
| | Silane coupling agent 1 | 8 | 8 | 8 | 8 | 8 | 8 | 8 | 8 | — | — | 8 | 8 |
| | Silane coupling agent 2 | — | — | — | — | — | — | — | — | 8 | — | — | — |
| | Silane coupling agent 3 | — | — | — | — | — | — | — | — | — | 8 | — | — |
| | Aluminum hydroxide | — | — | — | — | — | — | — | 10 | — | — | — | — |
| | Wax | 1 | 1 | 1 | 1 | 1 | 1 | 1 | 1 | 1 | 1 | 1 | 1 |
| | Antioxidant 1 | 2 | 2 | 2 | 2 | 2 | 2 | 2 | 2 | 2 | 2 | 2 | 2 |
| | Antioxidant 2 | 1.5 | 1.5 | 1.5 | 1.5 | 1.5 | 1.5 | 1.5 | 1.5 | 1.5 | 1.5 | 1.5 | 1.5 |
| | Compound 1 | 3 | — | — | — | — | — | — | — | — | — | — | — |
| | Compound 2 | — | 3 | — | — | — | 1 | 6 | 3 | 3 | 3 | 3 | 3 |
| | Compound 3 | — | — | 3 | — | — | — | — | — | — | — | — | — |
| | Compound 4 | — | — | — | 3 | — | — | — | — | — | — | — | — |
| | Compound 5 | — | — | — | — | 3 | — | — | — | — | — | — | — |
| | Compound 6 | — | — | — | — | — | — | — | — | — | — | — | — |
| | Compound 7 | — | — | — | — | — | — | — | — | — | — | — | — |
| | Compound 8 | — | — | — | — | — | — | — | — | — | — | — | — |
| | Process oil | — | — | — | — | — | 2 | — | — | — | — | — | — |
| | Resin | 8 | 8 | 8 | 8 | 8 | 8 | 8 | 8 | 8 | 8 | 8 | 8 |

TABLE 1-continued

|  |  | Example | | | | | | | | | | | |
|---|---|---|---|---|---|---|---|---|---|---|---|---|
|  |  | 1 | 2 | 3 | 4 | 5 | 6 | 7 | 8 | 9 | 10 | 11 | 12 |
|  | Zinc oxide | 2 | 2 | 2 | 2 | 2 | 2 | 2 | 2 | 2 | 2 | 2 | 2 |
|  | Stearic acid | 3 | 3 | 3 | 3 | 3 | 3 | 3 | 3 | 3 | 3 | 3 | 3 |
|  | Sulfur (5% oil content) | 1.5 | 1.5 | 1.5 | 1.5 | 1.5 | 1.5 | 1.5 | 1.5 | 1.5 | 1.5 | 1.5 | 1.5 |
|  | Vulcanization accelerator 1 | 2.5 | 2.5 | 2.5 | 2.5 | 2.5 | 2.5 | 2.5 | 2.5 | 2.5 | 2.5 | 2.5 | 3.5 |
|  | Vulcanization accelerator 2 | 2 | 2 | 2 | 2 | 2 | 2 | 2 | 2 | 2 | 2 | 2 | — |
| Evaluation | Viscosity index | 124 | 123 | 123 | 123 | 116 | 108 | 122 | 126 | 130 | 112 | 128 | 121 |
| results | Fuel economy index | 105 | 107 | 103 | 102 | 102 | 102 | 100 | 112 | 112 | 123 | 110 | 112 |
|  | Abrasion resistance index | 101 | 103 | 100 | 100 | 100 | 101 | 118 | 100 | 116 | 128 | 105 | 105 |

TABLE 2

|  |  | Comparative Example | | | | | | |
|---|---|---|---|---|---|---|---|---|
|  |  | 1 | 2 | 3 | 4 | 5 | 6 | 7 |
| Formulation (parts by mass) | SBR 1 | 96.3 | 96.3 | 96.3 | 96.3 | 96.3 | 96.3 | — |
|  | SBR 2 | — | — | — | — | — | — | 96.3 |
|  | BR | 30 | 30 | 30 | 30 | 30 | 30 | 30 |
|  | Carbon black | 5 | 5 | 5 | 5 | 5 | 5 | 5 |
|  | Silica 1 | 100 | 100 | 100 | 100 | 80 | 80 | 100 |
|  | Silica 2 | — | — | — | — | 20 | 20 | — |
|  | Silane coupling agent 1 | 8 | 8 | 8 | 8 | 8 | — | 8 |
|  | Silane coupling agent 2 | — | — | — | — | — | — | — |
|  | Silane coupling agent 3 | — | — | — | — | — | 8 | — |
|  | Aluminum hydroxide | — | — | — | — | — | — | — |
|  | Wax | 1 | 1 | 1 | 1 | 1 | 1 | 1 |
|  | Antioxidant 1 | 2 | 2 | 2 | 2 | 2 | 2 | 2 |
|  | Antioxidant 2 | 1.5 | 1.5 | 1.5 | 1.5 | 1.5 | 1.5 | 1.5 |
|  | Compound 1 | — | — | — | — | — | — | — |
|  | Compound 2 | — | — | — | — | — | — | — |
|  | Compound 3 | — | — | — | — | — | — | — |
|  | Compound 4 | — | — | — | — | — | — | — |
|  | Compound 5 | — | — | — | — | — | — | — |
|  | Compound 6 | — | 3 | — | — | — | — | — |
|  | Compound 7 | — | — | 3 | — | — | — | — |
|  | Compound 8 | — | — | — | 3 | 6 | — | — |
|  | Process oil | 3 | — | — | — | — | 3 | 3 |
|  | Resin | 8 | 8 | 8 | 8 | 8 | 8 | 8 |
|  | Zinc oxide | 2 | 2 | 2 | 2 | 2 | 2 | 2 |
|  | Stearic acid | 3 | 3 | 3 | 3 | 3 | 3 | 3 |
|  | Sulfur (5% oil content) | 1.5 | 1.5 | 1.5 | 1.5 | 1.5 | 1.5 | 1.5 |
|  | Vulcanization accelerator 1 | 2.5 | 2.5 | 2.5 | 2.5 | 2.5 | 2.5 | 2.5 |
|  | Vulcanization accelerator 2 | 2 | 2 | 2 | 2 | 2 | 2 | 2 |
| Evaluation | Viscosity index | 100 | 115 | 112 | 114 | 126 | 85 | 106 |
| results | Fuel economy index | 100 | 94 | 96 | 100 | 102 | 118 | 102 |
|  | Abrasion resistance index | 100 | 98 | 97 | 95 | 82 | 121 | 93 |

The rubber compositions in the examples containing a rubber component, a white filler, and a compound of formula (1) had excellent processability owing to their low rubber viscosity during kneading, despite containing the white filler, and further exhibited excellent fuel economy and excellent abrasion resistance.

The invention claimed is:

1. A rubber composition, comprising:
   a rubber component,
   a white filler, and
   a compound represented by the following formula (1):

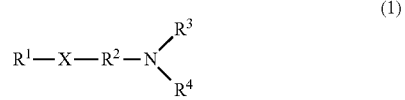

(1)

wherein X represents —CONH— or —COO—; $R^1$ represents a C7-C23 alkyl group or a C7-C23 alkenyl group; $R^2$ represents a C1-C3 alkylene group; and $R^3$ and $R^4$ each independently represent a hydrogen atom, a C1-C3 alkyl group, or a C1-C3 hydroxyalkyl group, and at least one of $R^3$ or $R^4$ is the hydroxyalkyl group, and
   wherein the amount of the styrene butadiene rubber is 30% by mass or more based on 100% by mass of the rubber component.

2. The rubber composition according to claim 1, wherein the compound of formula (1) is a fatty acid amide ethylaminoethanol.

3. The rubber composition according to claim 1, wherein the white filler includes silica.

4. The rubber composition according to claim 1, which is a rubber composition for tires.

5. A pneumatic tire, including a tire component formed from the rubber composition according to claim 1.

6. The rubber composition according to claim 1,
wherein the rubber composition comprises polybutadiene rubber which has a vinyl content of 1.8% by mass or lower.

7. The rubber composition according to claim 1,
wherein the amount of the white filler per 100 parts by mass of the rubber component is 40 parts by mass or more.

8. The rubber composition according to claim 1,
wherein the amount of the white filler per 100 parts by mass of the rubber component is 80 parts by mass or more.

9. The rubber composition according to claim 1,
wherein the rubber composition comprises thiazole vulcanization accelerators and guanidine vulcanization accelerators.

10. The rubber composition according to claim 1,
wherein the rubber composition comprises resin.

11. The rubber composition according to claim 1,
wherein the rubber composition comprises terpene-based resin.

12. A rubber composition, comprising:
a rubber component,
a white filler, and
a compound represented by the following formula (1):

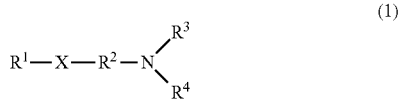

(1)

wherein X represents —COO—; $R^1$ represents a C7-C23 alkyl group or a C7-C23 alkenyl group; $R^2$ represents a C1-C3 alkylene group; and $R^3$ and $R^4$ each independently represent a hydrogen atom, a C1-C3 alkyl group, or a C1-C3 hydroxyalkyl group, and at least one of $R^3$ or $R^4$ is the hydroxyalkyl group.

13. The rubber composition according to claim 12,
wherein the amount of the styrene butadiene rubber is 30% by mass or more based on 100% by mass of the rubber component.

14. The rubber composition according to claim 12,
wherein the white filler includes silica.

15. The rubber composition according to claim 12, which is a rubber composition for tires.

16. A pneumatic tire, including a tire component formed from the rubber composition according to claim 12.

17. The rubber composition according to claim 12,
wherein the rubber composition comprises polybutadiene rubber which has a vinyl content of 1.8% by mass or lower.

18. The rubber composition according to claim 12,
wherein the amount of the white filler per 100 parts by mass of the rubber component is 40 parts by mass or more.

19. The rubber composition according to claim 12,
wherein the amount of the white filler per 100 parts by mass of the rubber component is 80 parts by mass or more.

20. The rubber composition according to claim 12,
wherein the rubber composition comprises resin.

* * * * *